(12) United States Patent
Schneider

(10) Patent No.: US 6,900,733 B2
(45) Date of Patent: May 31, 2005

(54) RAIN SENSOR, PARTICULAR FOR A MOTOR VEHICLE AND METHOD FOR MOUNTING A RAIN SENSOR

(75) Inventor: Andreas Schneider, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/344,905
(22) PCT Filed: Dec. 29, 2001
(86) PCT No.: PCT/DE01/04942
§ 371 (c)(1), (2), (4) Date: Jul. 23, 2003
(87) PCT Pub. No.: WO02/102632
PCT Pub. Date: Dec. 27, 2002

(65) Prior Publication Data
US 2004/0020285 A1 Feb. 5, 2004

(30) Foreign Application Priority Data
Jun. 15, 2001 (DE) .......................... 101 29 038

(51) Int. Cl.$^7$ .......................... G08B 21/00; G01W 1/00
(52) U.S. Cl. ................. 340/602; 340/601; 340/603; 340/604; 340/618; 340/619; 73/170.17; 73/170.19; 73/170.21
(58) Field of Search ................. 340/601–604, 340/618, 619; 73/170.17, 170.19, 170.21; 385/56, 59

(56) References Cited

U.S. PATENT DOCUMENTS

| | | | |
|---|---|---|---|
| 4,801,191 A | * | 1/1989 | Nakai et al. .................. 385/59 |
| 5,414,257 A | | 5/1995 | Stanton ................. 250/227.25 |
| 6,084,519 A | | 7/2000 | Hegyi et al. ................ 340/602 |
| 6,464,405 B2 | * | 10/2002 | Cairns et al. ................. 385/56 |
| 6,526,820 B1 | * | 3/2003 | Schmid et al. .......... 73/170.17 |

FOREIGN PATENT DOCUMENTS

| | | |
|---|---|---|
| DE | 197 25 287 | 12/1998 |
| DE | 198 46 968 | 10/1999 |
| EP | 0 957 017 | 11/1999 |

* cited by examiner

Primary Examiner—Jeffery Hofsass
Assistant Examiner—Lam Pham
(74) Attorney, Agent, or Firm—Kenyon & Kenyon

(57) ABSTRACT

A rain sensor and a method for installing a rain sensor are provided for a motor vehicle. The rain sensor includes a housing in which at least one printed circuit board is located and which has a light-conducting member, which at least partially closes the housing in the manner of a lid. A plate is located between the light-conducting member and the printed circuit board. During installation, the plate is partially punched through.

10 Claims, 1 Drawing Sheet

RAIN SENSOR, PARTICULAR FOR A MOTOR VEHICLE AND METHOD FOR MOUNTING A RAIN SENSOR

FIELD OF THE INVENTION

The present invention relates to a rain sensor, in particular for a motor vehicle, and a method for installing a rain sensor.

BACKGROUND INFORMATION

There are numerous rain sensors for motor vehicles, for instance, as recited in German Published Patent Application No. 198 46 968. Essentially, the rain sensors consist of a housing in which a printed-circuit board having a transmitter and a receiver are located as optical components, and which is closed off by a light-conducting member mounted on the windshield of a motor vehicle. When in operation, the transmitter emits infrared radiation, which is coupled into the windshield by the light-conducting member mounted on the windshield of the motor vehicle. If moisture is present on the outside of the windshield, the radiation of the transmitter at this boundary surface is scattered toward the outside. If there is no moisture on this boundary surface, the radiation of the transmitter is completely reflected at this glass-air boundary surface. This completely reflected radiation is concentrated by the light-conducting member and focused on the receiver, which then emits a signal that may be taken as the degree of the moisture present on the windshield.

However, in the manufacture of motor vehicles, the light-conducting member is often already mounted on the windshield when the window is produced. In the final production phase, the housing with the printed-circuit board is then attached to the light-conducting member, by a clip-on connection, for instance, so that the light-conducting member closes the housing like a lid.

SUMMARY OF THE INVENTION

The rain sensor according to the present invention reduces potential damage to the electronic system on the printed circuit board resulting from electrostatic discharge (ESD) by the mounting of a plate between the light-conducting member and the printed circuit board. This has the advantageous result that no ESD-protected work areas are necessary in the manufacture or for required spare-parts.

The plate may have a design that has a cut-out in the area where a transmitter or a receiver, as an optical component, interacts with the light-conducting member. This ensures that the plate does not dampen or even inhibit the interaction of the optical component with the light-conducting member.

The plate may be very thin and thus configured as a foil and, at least in part, provided with a perforation in the coupling region. Since the light-conducting member is to be pierced by the housing only when it is mounted directly on the light-conducting member, the installation requires no additional tools.

The light-conducting member may be provided with separation aids for the through-punching of the plate, so that a reliable through-punching of the plate in the coupling region is ensured in series production.

A subcarrier having a cut-out in the coupling areas, that is, in the regions of the optical components, may be situated between the printed-circuit board and the light-conducting member. This allows the plate to be designed as a thin foil, without any loss in stability of the system.

If the plate is in the form of a paper foil, a metal-coated paper foil or plastic film, the electronics of the rain sensor may be protected from ESD damage in a simple and inexpensive manner.

Moreover, the plate may be of a foil-type, optically transparent and stretchable and clings to the light-conducting member in the coupling regions, since no through-punching of the foil will be necessary in that case.

Furthermore, contact devices may extend from the housing through the plate. These may be used, for example, for contacting a heating device.

A simple possibility of ESD protection is given, especially in the spare-part trade, if the plate is in the form of a foil and is able to be peeled off from the housing or the subcarrier. The subcarrier may have a cut-out only in the areas of the optical components, so that adequate protection is ensured even after the foil has been peeled off.

The method also may provide that the plate that protects the printed-circuit board from ESD damage is pierced only during installation of the housing on the light-conducting member. In this way, ESD damage during installation of the housing on the light-conducting member is avoided and ESD-protected work areas may be saved.

An electrical component, which is operatively connected to a mechanical or optical component, may be protected from damage stemming from electrostatic discharge (ESD) by a simple plate.

DETAILED DESCRIPTION

Figure 1:
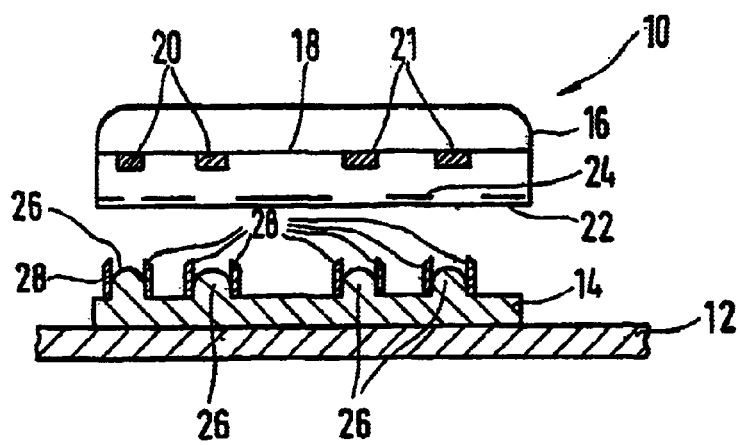
FIG. 1 is a schematic sectional view of a rain sensor according to the present invention, prior to installation.

FIG. 1 illustrates a rain sensor 10 according to the present invention, prior to the final installation. A light-conducting member 14, over which a housing 16 with a printed-circuit board 18 may be slipped, is glued onto a window 12. A coupling medium may be disposed between window 12 and light-conducting member 14 as well. Printed-circuit board 18, on which electronic and optical components are affixed in SMD technology, is clipped into housing 16. The optical components are transmitter 20 and receiver 21 of rain sensor 10 and are used to transmit and receive IR-radiation. Transmitter 20 and receiver 21 are implemented as semiconductor components. Located between printed-circuit board 18 and light-conducting member 14, is a foil-type plate 22, which is supported by a subcarrier 24. Subcarrier 24 is a plastic plate, which has cut-outs in the regions of optical components 20, 21. Prior to installation, housing 16 is thus closed off by plate 22.

Light-conducting member 14 has lens-type projections 26 which are provided to couple the radiation of transmitters 20 or to focus the radiation to receivers 21.

When housing 16 is slid onto light-conducting member 14, foil-type plate 22 is pierced by separation aids 28. These separation aids 28 are, for example, circular structures extending around protrusions 26 and projecting beyond them. When housing 16 is slid on, separation aids 28, therefore, cut through plate 22 in the region of protrusions 26 and, thus, in coupling region 30 (FIG. 2) between optical components 20, 21 and protrusions 26. A perforation in foil-type plate 22 may aid this process.

Figure 2:
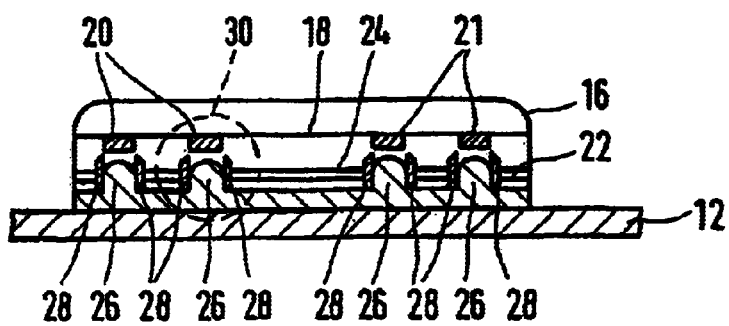
FIG. 2 is a rain sensor according to FIG. 1, after installation.

In FIG. 2, a rain sensor 10 according to the present invention is illustrated in the mounted position on window 12. Separation aids 28 have cut through foil 22 in coupling areas 30, so that foil 22 is cut out between protrusions 26 and associated optical components 20, 21.

Figure 3:
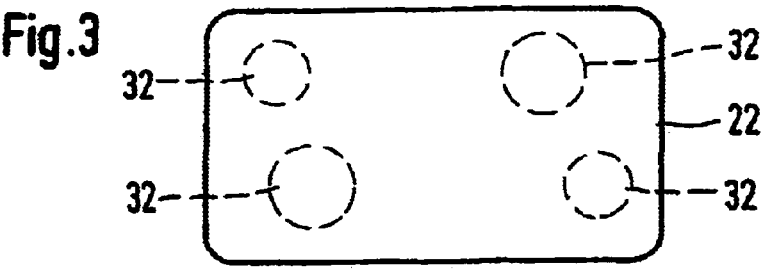
FIG. 3 is a plan view of a foil of a rain sensor according to the present invention.

FIG. 3 illustrates a plate 22 in a plan view. Plate 22 has the same outer contour as housing 16 and seals the housing from electrostatic discharge. Plate 22 is made of a metal-plated paper foil, for instance. Expediently, the metal-coating is on the outside of housing 16, i.e. on the side facing away from printed-circuit board 18, so as to prevent inadvertent short-circuits in response to plate 22 making contact with the printed-circuit board.

In coupling regions 30, where optical components 20, 21 are located, plate 22 has a circular perforation 32 which facilitates the through-punching of plate 22 by separation aids 28 when it is slid onto light-conducting member 14 (FIG. 1).

Figure 4:
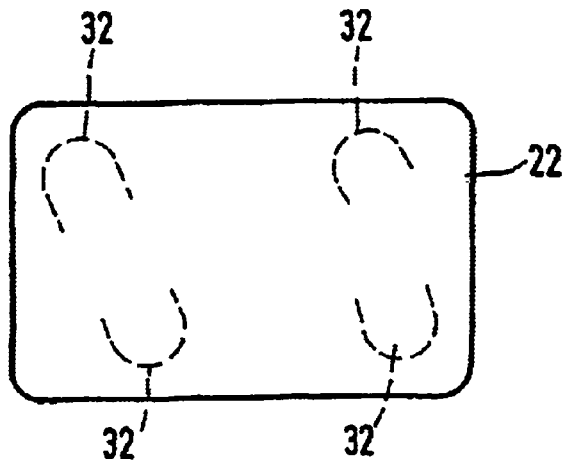
FIG. 4 is a plan view showing a variation of the foil from FIG. 3.

In FIG. 4, a variation of the foil from FIG. 3 is illustrated. In this case, the perforation is not implemented in a completely circular shape, but approximately in a U-shape. When housing 16 is slid onto light-conducting member 14, the plate sections are not detached but merely displaced such that a coupling between optical components 20, 21 and protrusions 26 in coupling region 30 is made possible. This prevents pieces of plate 22 from remaining inside the housing in an undefined manner following installation, thereby possibly causing malfunctions. To that end, light-conductor 14 may also have additional formations that keep the punched-out pieces in a defined position.

In a variant of the present invention, it is possible, for example, to provide separation aids 28 at subcarrier 24 or on printed-circuit board 18.

In another exemplary embodiment of the present invention, plate 22 is implemented as a peel-off foil. Subcarrier 24 covers printed-circuit board 18 in the direction of light-conducting member 14, leaving uncovered only the coupling regions 30 of optical components 20, 21. Foil-type plate 22 is glued to subcarrier 24 or to the edge of housing 12 and is peeled off just before housing 12 and light-conducting member 14 are joined.

In a further simplification, subcarrier 24 may be omitted and only a plate 22 with recesses in coupling regions 30 be provided. In this case, optical components 20, 21 may also be protected with the aid of a simple protective cap, which is removed prior to installation.

As a rule, the method is also implementable for other control devices, such as control devices of wiper motors or ABS in which optical or mechanical components are separable from electrical components. In the case of a wiper motor, protrusions 26 or pins, for example, may be used as contact points on the outside of the housing of the wiper motor, the control electronics being accommodated in a separate housing. This separate housing is then closed off by a plate 22. When the separate housing with the control electronics is slid over the housing of the wiper motor, plate 22 is punched through by protrusions 26 and the wiper motor thereby contacts the control electronics.

What is claimed is:

1. A rain sensor, comprising:

a housing having at least one printed-circuit board;

at least one light-conducting member at least partially closing off the housing; and a plate positioned between the at least one light-conducting member and the at least one printed-circuit board to protect the at lest one printed-circuit board.

2. The rain sensor according to claim 1, further comprising:

at least one optical component provided on the at least one printed-circuit board, wherein the at least one optical component interacts with the at least one light-conducting member in a coupling region, and wherein the plate is configured with cut-outs in the coupling region.

3. The rain sensor according to claim 2, wherein the plate is configured as a thin foil and is provided with perforations in the coupling region.

4. The rain sensor according to claim 3, wherein the at least one light-conducting member is provided with separation aids for punching through the perforations in the plate.

5. The rain sensor according to claim 2, further comprising:

a subcarrier positioned between the at least one printed-circuit board and the at least one light-conducting member, wherein the subcarrier is configured with a recess in a region of the at least one optical component.

6. The rain sensor according to claim 5, wherein the plate is configured as a foil and is able to be peeled off from one of the housing and from the subcarrier.

7. The rain sensor according to claim 1, wherein the plate is configured as a foil and is made of one of a paper, a metal-coated paper and a plastic.

8. The rain sensor according to claim 1, wherein the plate is configured as a foil, optically transparent, stretchable and is configured to cling, at least partially, to the at least one light-conducting member.

9. The rain sensor according to claim 5, wherein comprising:

contact devices configured to extend out of the housing through the plate.

10. A method for installing a rain sensor, comprising:

mounting a light-conducting member on a window; and sliding a housing onto the light-conducting member, the housing including at least one printed-circuit board having at least one optical component, wherein the housing is closed off, at least partially, by a plate, and wherein the plate is pierced by the light-conducting member in a region of the at least one optical component.

* * * * *